United States Patent [19]

Grinberg et al.

[11] Patent Number: 4,933,895

[45] Date of Patent: Jun. 12, 1990

[54] CELLULAR ARRAY HAVING DATA DEPENDENT PROCESSING CAPABILITIES

[75] Inventors: Jan Grinberg; James G. Nash, both of Los Angeles; Michael J. Little, Woodland Hills, all of Calif.

[73] Assignee: Hughes Aircraft Company, Los Angeles, Calif.

[21] Appl. No.: 72,195

[22] Filed: Jul. 10, 1987

[51] Int. Cl.[5] .......................... G06F 7/38; G06F 15/16
[52] U.S. Cl. ..................................... 364/748; 364/200
[58] Field of Search ............... 364/748, 736, 200, 900

[56] References Cited

U.S. PATENT DOCUMENTS

| | | | |
|---|---|---|---|
| 3,701,976 | 10/1972 | Shively | 364/200 |
| 4,215,401 | 7/1980 | Holsztynski et al. | 382/41 |
| 4,239,312 | 12/1980 | Myer et al. | 339/17 |
| 4,275,410 | 6/1981 | Grinberg et al. | 357/68 |
| 4,467,422 | 8/1984 | Hunt | 364/200 |
| 4,468,727 | 8/1984 | Carrison et al. | 364/200 |
| 4,498,134 | 2/1985 | Hansen et al. | 364/200 |
| 4,507,726 | 3/1985 | Grinberg et al. | 364/200 |
| 4,524,428 | 6/1985 | Grinberg et al. | 364/900 |
| 4,622,632 | 11/1986 | Tanimoto et al. | 364/200 |
| 4,720,780 | 1/1988 | Dolecek | 364/200 |
| 4,745,546 | 5/1988 | Grinberg et al. | 364/200 |

FOREIGN PATENT DOCUMENTS 0195245 9/1986 European Pat. Off. .

OTHER PUBLICATIONS

Grinberg et al., "A Cellular VLSI Architecture", IEEE 1984, pp. 69-81.
Reddaway, "DAP-A Distributed Array Processor", Proceedings of the First Symposium on Computer Architecture, IEEE 1973, pp. 61-65.
Batcher, "The Massively Parallel Processor (MPP) System", AIAA, Proceedings of the Computers in Aerospace Conference 2, 1979, pp. 93-97.

Primary Examiner—Gary V. Harkcom
Assistant Examiner—Tan Van Mai
Attorney, Agent, or Firm—V. D. Duraiswamy; P. M. Coble; W. K. Denson-Low

[57] ABSTRACT

A cellular array processor (10) for efficiently performing data dependent processing such as floating point arithmetic functions. One module (84) in the array processor (12) generates a signal applied to bus line (24) when all of the bits in a register (86) are zero. The signal on bus line (24) effects the shifting operation of a shift register (36) in a memory module (34) located on a different functional plane. Thus, the processing functions carried out in each elemental processor (26) can be made to depend on the value of data stored therein instead of being dictated solely by a simultaneous executed instruction from the control processor (14) as is the normal case.

9 Claims, 5 Drawing Sheets

CELLULAR ARRAY HAVING DATA DEPENDENT PROCESSING CAPABILITIES

CROSS REFERENCE TO RELATED APPLICATIONS AND PATENTS

The subject matter of this invention is related to the following U.S. patent applications and Pat. Nos. which are hereby incorporated by reference:

(1) U.S. patent application Ser. No. 392,207, filed June 25, 1982 entitled "Column Shorted and Full Array Shorted Functional Plane for Use in a Modular Array Processor and Method for Using Same" now U.S. Pat. No. 4,745,546 and assigned to the assignee of the present invention;

(2) U.S. Pat. No. 4,275,410 issued June 23, 1981 and assigned to the assignee of the present invention;

(3) U.S. Pat. No. 4,498,134 issued Feb. 5, 1985 and assigned to the assignee of the present invention;

(4) U.S. Pat. No. 4,507,726 issued Mar. 26, 1985 and assigned to the assignee of the present invention;

(5) U.S. Pat. No. 4,239,312 issued Dec. 16, 1980 entitled "Parallel Interconnect For Planar Arrays" and assigned to the assignee of the present invention; and (6) U.S. Pat. No. 4,524,428 issued June 18, 1985 and assigned to the assignee of the present invention.

BACKGROUND OF THE INVENTION

1. Technical Field

The present invention generally relates to the field of computer aided data analysis and, in particular, to highly specialized computers capable of processing two dimensionally structured data sets, generally referred to as images, that are known as Cellular Array Processors (CAP).

2. Discussion

In the field of image processing, the Cellular Array Processor is generally well-known as a type of computer system whose architecture is particularly suited for the task of image processing. Although the specific design may differ substantially between different implementation, the general architecture of the Cellular Array Processor is quite distinctive. Typically, a system will include a highly specialized array processor that is controlled by a control processor of conventional design. The array processor, in turn, is formed from a large number of elemental processors that are distributed as individual cells within a regular matrix. (This gives rise to the descriptive name "Cellular Array Processor".) The elemental processors are essentially identical and generally contain a function-programmable logic circuit and memory register. The programmable logic circuit is typically capable of selectively performing a limited number of primitive logic and arithmetic functions, such as "and", "or", "invert", and "rotate" on the data stored in its respective memory register in conjunction with data provided by the control processor. The control processor is linked to the elemental processors via a common instruction bus. Thus, all of the elemental processors operate separately, yet synchronously, in the performance of a common logical function on the data contained in their respective memory registers. (This is commonly referred to as Single Instruction, Multiple Data, or SIMD operation.)

Cellular Array Processor systems are particularly well suited for image processing applications, since the memory registers present in the cellular array permit the digital representation of the image to be mapped directly into the processor. Thus, the spatial interrelationship of the data within the two-dimensionally structured data set is intrinsically preserved. By directing the array processor to perform a selected sequence of SIMD logical operations corresponding to the performance of a desired image processing algorithm, the data at every point in the image can be processed essentially in parallel. Naturally, both the effective processing speed (the product of the number of instructions per second executed by an elemental processor and the number of elemental processors operating simultaneously) and the resolution of the image being processed can be increased directly by the use of additional elemental processors. In addition to the image processing, the cellular processors are well suited for matrix calculations also.

Although the Cellular Array Processor architecture is a relatively recent development within the more general field of computer aided data analysis, a substantial number of systems utilizing the architecture have been developed. While many of the systems were specifically designed for general application purposes, quite a number have been designed for considerably more specialized applications. Descriptions of a number of the general application systems can be found in S. F. Reddaway, DAP-A Distributed Processor, IEEE, Proceedings of the First Symposium on Computer Architecture, pp. 61-65 (1973), General Purpose Array Processor, U.S. Pat. No. 3,815,095 issued to Aaron H. Wester on June 4, 1974, K. E. Batcher, Array Processor, U.S. Pat. No. 3,979,728 issued to Stewart Reddaway on Sept. 7, 1976, The Massively Parallel Processor (MPP) System, AIAA, Proceedings of The Computers in Aerospace Conference 2, pp. 93-97 (1979), and Parallel Type Processor with a Stacked Auxiliary Fast Memories, U.S. Pat. No. 4,144,566 issued to Claude Timsit on Mar. 13, 1979. A number of the more specialized systems are described in Floating Point Arithmetic Unit for a Parallel Processing Computer, U.S. Pat. Nos. 3,701,976 issued to Richard Shivety on Oct. 31, 1972; Network Computer System, 4,065,808 issued to Herman Schomberg et al. on Dec. 27, 1977; and Scientific Processor, 4,101,960 issued to Richard Stokes et al. on July 18, 1978.

In each of these system implementations, a significantly different elemental processor design is used in order to tailor the array processors for their anticipated applications. This is principally due to the extremely wide variety of their possible applications and equally wide variety of subcomponents that can be utilized. However, a common feature of these elemental processors is that a high degree of component interconnection is used in order to optimize the elemental processor processing speed.

The particular disadvantage of using highly optimized elemental processor designs is that any significant change in the anticipated data processing application will require the elemental processors to be substantially redesigned in order to preserve the system's overall data processing capability and efficiency. This is a practical consequence of the fact that the subcomponents are too highly specialized and interconnected to allow any significant alteration or extension of the elemental processors' component composition.

The general purpose of the inventions disclosed in those patents and applications incorporated by reference and cross referenced above is to provide an Array Processor composed of Elemental Processors of a distinctly modular architecture design that can be particularly configured for a wide variety of data processing applications.

The Array Processor disclosed therein is comprised of a plurality of modular Elemental Processors, the modules being of a number of different functional types. These modules may be of such general functional types of memory and accumulator, with each type nominally including an input programmable logic circuit and a closely associated memory register. The modules of the Array Processor are associated so that the Elemental Processors are architecturally parallel to one another. The principal flow of data within the Array Processor, based on the simultaneous transfer of data words within the Elemental Processors, is thereby correspondingly parallel. The modules are also architecturally associated as functional planes that lie transverse to the Elemental Processors. Each functional plane is thereby comprised of an array of modules that are each otherwise associated with a separate Elemental Processor. Further, the modules of a functional plane are of a single functional type. This allows the data of a two-dimensionally structured data set, present within the Array Processor, to be processed identically and in parallel by a common logical operation as provided and performed by a functional plane.

The Array Processor is operatively connected to a Control Processor by an Array/Control Processor interface. This interface allows the control processor to direct the operation of and exchange data with the Array Processor.

A particular advantage of this approach is the high degree of design flexibility that is inherent in the modular Elemental Processor. Its design may be optimized for any particular data processing application through the selection of an appropriate number of each functional type of module. Since practically any image processing function can be reduced to a small number of basic data manipulation functions which may, in turn, be implemented in modules, the Array Processor can be optimized for almost any application.

Another advantage is that the modularity of the Elemental Processors allows an Array Processor to be made fault tolerant. This is accomplished by providing an appropriate number and type of spare modules in each of the Elemental Processors.

A further advantage is that there is a uniform array of memory registers at each level within the Array Processor. This allows a number of unique image and image analysis-related data sets to be simultaneously present within the Array Processor. Therefore, they are immediately present for use during the processing of an image.

Still another advantage is that modules having nearest neighbor data interconnections to other modules on the same array level and therefore between neighboring Elemental Processors, can be placed on a number of levels within the Array Processor. This allows the data sets present in the modules on those levels to be independently transferred across the array in either similar or different directions.

Despite all of its advantages, the computer architecture of the incorporated by reference documents can still be improved. For example, the SIMD nature of the operation of this and other cellular arrays does not lend itself to performing data dependent processing. In other words, the earlier cellular arrays are primarily designed to simultaneously perform a given operation on the data that may be stored in each elemental processor and that operation is usually carried out regardless of the value of the data in each module. There is very little control provided to enable each elemental processor to process the data as a function of the data itself, as compared to the SIMD approach where the processing in each elemental processor is a function of a single instruction rather than the data.

There exists a need for a cellular array architecture that permits it to do data dependent processing. For example, there are many occasions when it would be beneficial for the cellular array to be capable of performing floating point arithmetic functions. As will appear, a computer must generally have a high degree of data dependant branching capability in order to accomplish floating point arithmetic. Doing calculations on arrays of data in general will result in overflow in some data points, underflow in others, and in some, the right order of magnitude will result. Also, to add or subtract two numbers, one first has to adjust them to the same exponent. All of these arithmetic functions require dealing with the data on a pixel by pixel basis. Many of the known massively parallel cellular arrays do not readily lend themselves to performing this type of processing efficiently.

There are obviously still other applications such as skewing and remote neighbor communications where it would be desirable to control the processing in one module associated with the same elemental processor as a function of the detection of a preselected data value in another module.

SUMMARY OF THE INVENTION

The present invention provides improvements to an array processor for analyzing two dimensional arrays of spatially related data elements. The processor includes a matrix of elemental processors defined by a plurality of functional planes. Each plane includes an array of modules containing logic means for performing at least one of a given number of logic functions on the data elements. Each module has a memory for storing at least one data element of a given value therein to be logically operated on by the logic means. A data exchange subsystem is provided for transferring data between modules on different functional planes.

Pursuant to the present invention, provision is made for detecting a preselected value of a data element in a given module associated with a particular elemental processor. In addition, the improvement includes means for controlling the operation of the logic means in another module on a different plane of the same elemental processor as a function of the detection of said value. In a preferred embodiment, a given output signal is generated upon detection of said preselected value which is transmitted over the data exchange subsystem to all of the other modules associated with the same elemental processor. In such manner, each elemental processor can perform data dependent processing operations on the data array.

BRIEF DESCRIPTION OF THE DRAWINGS

The various advantages of the present invention will become apparent to one skilled in the art upon reading the following specification and by reference to the drawings in which.

DESCRIPTION OF THE PREFERRED EMBODIMENT

I. Overview

A detailed description of the construction and operation of the array processor 10 is provided in the aforementioned patent documents which have been incorporated by reference. Consequently, the following specification provides a concise written description of the best mode currently contemplated by the inventors of carrying out the improvements to which this invention is directed. If the reader requires further background information, his attention is directed to the aforementioned incorporated by reference documents.

Figure 1:
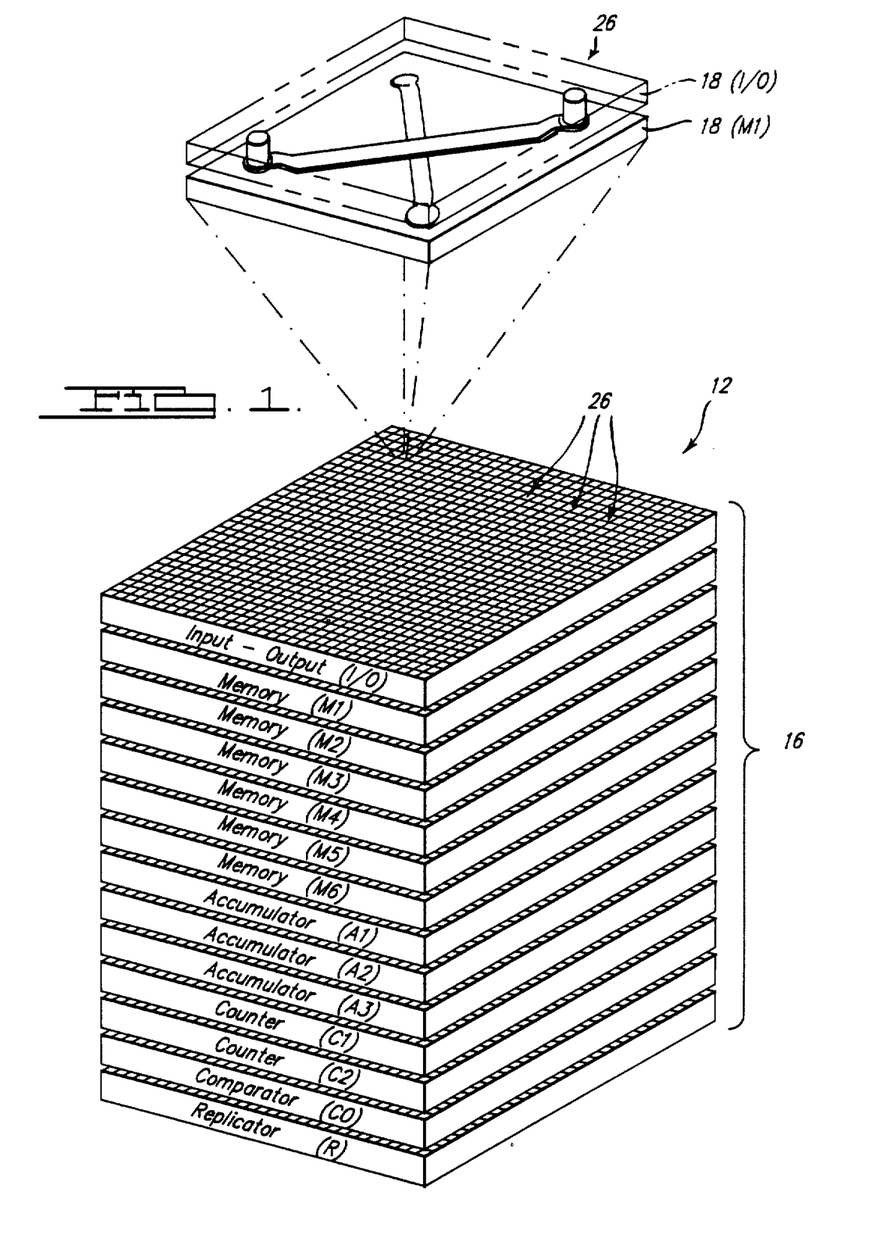
FIG. 1 is a perspective view which diagrammatically illustrates an array processor made in accordance with the teachings of the preferred embodiment of this invention.
Figure 2:
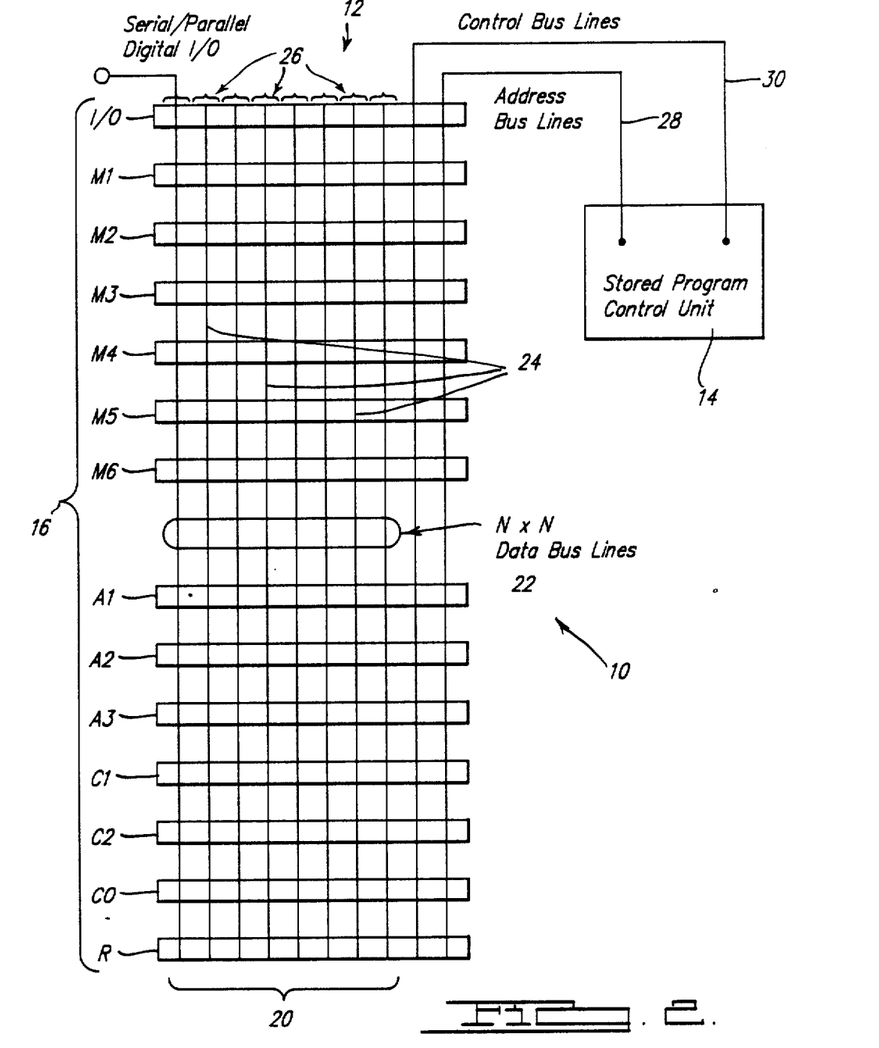
FIG. 2 is a schematic block diagram illustrating the connection of various functional planes in the array processor to a control processor suitable for directing the operation of the array processor.

Briefly and with particular reference to FIGS. 1 and 2, the present invention is directed to a cellular array processor (CAP) system 10 comprised of two principal components: an array processor 12 and a control processor 14. The array processor 12 is defined by a plurality of functional planes 16. Each plane 16 includes an $N \times N$ array of modules 18. Each module contains logic means for performing at least one of a given number of logic functions on data stored therein. As will appear, each module 18 has a memory for storing a data element of a given value that is to be logically operated on by the logic means in the module. The modules of a given functional plane are essentially identical. However, modules on different functional planes are particularly designed to efficiently perform different functional types of logical operations. In the preferred embodiment of this invention, there are several different types of functional planes. For example, in accordance with the preferred embodiment of this invention, there are provided functional planes which are designed to perform input/output operations (I/O), those that are primarily designed for memory operations (M1-M6), accumulator operations (A1-A3), counting and shifting operations (C1-C2), while other functional planes function as comparators and replicators. The replicator functional plane is also referred to as a "shorted plane" in the aforementioned pending U.S. patent application.

Although each of the modules listed above is tailored to perform a given function, it should be understood that practically any basic data manipulation function can be implemented. In general, such an implementation should (1) be of a standard logic design, such as bit serial arithmetic, (2) provide all of the logical and data manipulation operations that are required by and consistent with its general functional type, including data storage and transfer, and (3) include a data transfer circuit, typically consisting of a data transmitter and receiver so that all of the modules 18 share a common means of data exchange.

The array processor 12 further includes a data exchange subsystem which is generally designated by the numeral 20. As explained more fully in the above referenced patent documents, the data exchange subsystem 20 includes a data bus 22 containing a plurality of individual data lines 24. Each of the data lines 24 run vertically through the stack of functional planes or wafers and are connected to one module in each of the different functional planes.

The data subsystem 20 also includes provision for each module on a given functional plane to communicate with each of its four neighbors: north (NO), south (SO), east (EA) and west (WE).

The data lines 24 provide a common interconnection between all of the modules which make up one of the $N \times N$ array of individual elemental processors 26. Thus, when viewed in connection with FIG. 1, each elemental processor 26 is comprised of a stack of modules in different functional planes which are connected together by a common data line 24.

The program storage and sequencing of the matrix of elemental processors 26 is accomplished through the use of the stored program control processor 14. Control processor 14 communicates with the array processor 12 by way of address 28 and control bus lines 30 that pass through all of the wafers or functional planes 16. Each functional plane includes an address decoder and instruction or configuration latch connected to these lines. In preparation for an operation, the control unit 14 configures two or more of the planes 16 by transmitting its address over the address bus 28 and the appropriate configuration code over the control bus 30. In this way, all of the functional planes to be used in a particular operation are configured sequentially prior to the start of the operation.

II Memory Module

Figure 3:
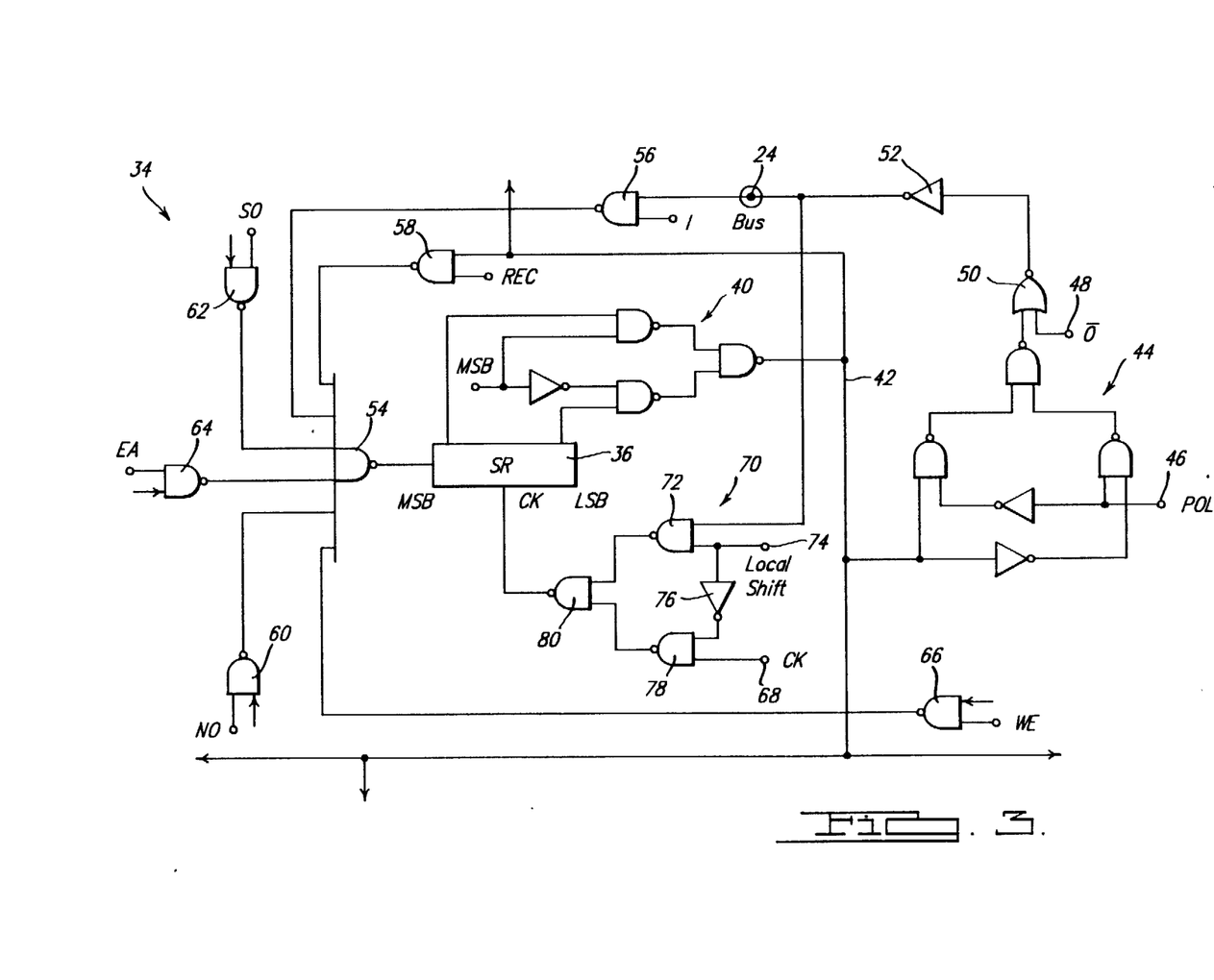
FIG. 3 is a schematic diagram of a memory functional module.

FIG. 3 schematically illustrates the components making up the memory modules on memory functional planes M1-M6. It will be remembered that the modules are substantially identical in each functional plane and, consequently, a description of memory module 34 of FIG. 3 will suffice. For the most part, module 34 is similar to the memory module construction disclosed in more detail in the aforementioned patent documents which have been incorporated by reference. Consequently, the following description concentrates on new features and some background information to make an understanding of this invention easier.

The central component of memory module 34 is a multi-bit register 36. Clock pulses on the input line labeled CK cause data contained in the register 36 to be shifted right by one bit, thereby providing for the serial transfer of data both to and from register 36. Thus, when CK pulses are applied, serial data from the most significant bit (MSB) or least significant bit (LSB) of register 36, depending upon the logic state of MSB programmable input 38, is transferred through a data selector circuit 40 to the output line 42. The serial data on output line 42 is made available to each of the four nearest neighboring memory modules (NO, SO, EA and WE) within its respective functional plane. The data on line 42 is also made available to the data bus line 24 through a polarity selection circuit 44. Polarity selection circuit 44 serves to either invert or not invert the data on line 42 depending upon the state of the POL programmable input 46. The output of polarity selection circuit 44 is combined with the output enable signal on the 0 programmable input line 48 by NOR gate 50. This results in either the data or a logical 1 being buffered by the open collector output buffer 52 onto the data bus line 24 and thereby made available to the modules on other functional planes for a given elemental processor 26.

Data can be serially input into the register 36 through a variety of sources such as by way of NAND gate 54 having inputs connected to a number of different sources. One such source is from the data bus line 24 through enable gate 56. Another source is from the register 36 itself through a recirculating NAND gate 58. The remaining sources are from the four nearest neighbor memory modules via gates 60, 62, 64 and 66.

An important feature of the present invention is the provision that enables the shifting of shift register 36 to be controlled by pulses applied over data bus line 24. This capability is in addition to the normally used approach where clock pulses CK are applied over a control line 68 from the control processor 14. The clock pulses on bus line 24 can be generated by any convenient source. For example, a fully loaded shift register in an unused memory module can be shifted out onto the data bus 24 to assimilate clock pulses. As will appear, this enables the module 34 to do data dependent processing since the shifting of register 36 can be made to be dependent upon clock signal derived over bus line 24 which, in turn, is a function of data which is stored in another module associated with the same elemental processor 26 as memory module 34.

To accomplish this end, a logic network 70 is provided having a NAND gate 72 with one input coupled to the output of bus line 24. The other input to gate 72 is from a programmable input labeled LOCAL SHIFT provided over line 74 from control processor 14. A logical 1 level on line 74 causes the logical states on inverter 76 and NAND gate 78 to be such that the clock pulses applied from the output of gate 80 are derived from data bus line 24. An opposite logical state on LOCAL SHIFT line 74 blocks the data bus line 24 from influencing the generation of the clock pulses which are instead derived over the normal clock control line 68. Alternatively, provision can be made to block or prevent pulses on line 68 from reaching the CK input as a function of the logic state on bus line 24 which, in turn, can be a function of the value of data in a module on another functional plane.

Any of the modules in the other functional planes for a given elemental processor 26 can provide the data dependent signal over data bus line 24 to the memory module 34. In this embodiment, it is provided by a counter module 84 shown in FIG. 4.

III Counter Module

Figure 4:
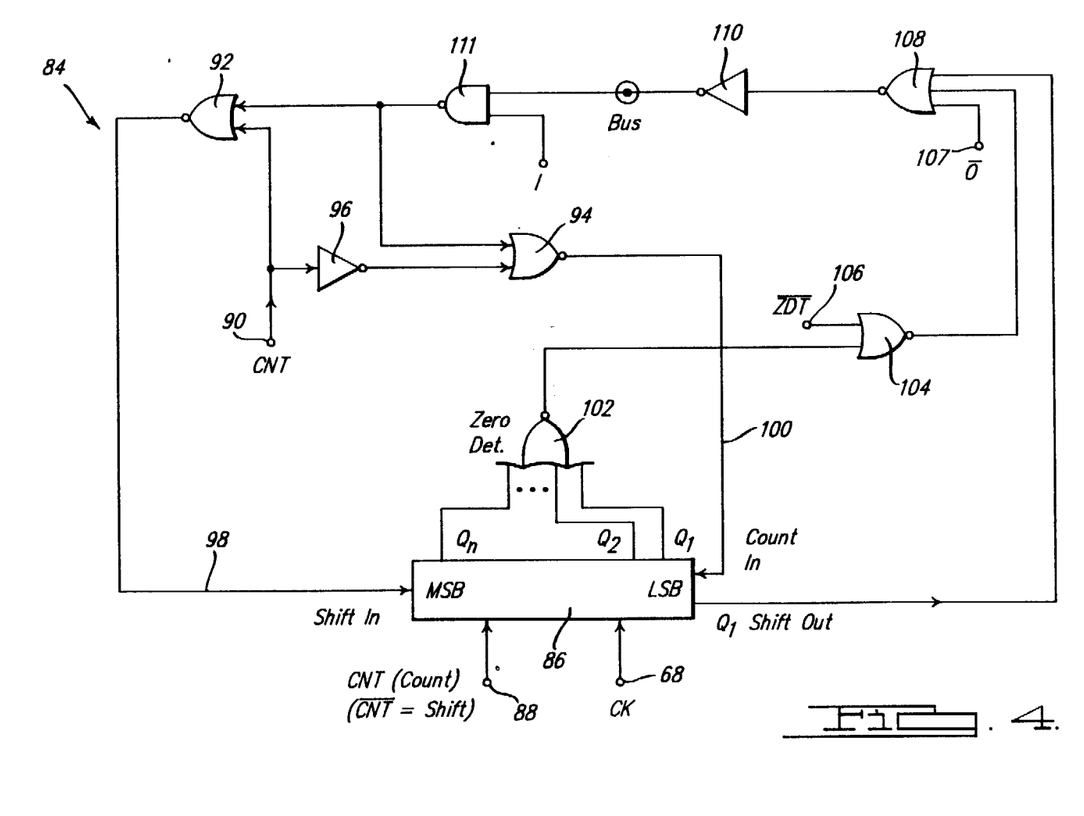
FIG. 4 is a schematic diagram of a counter functional module.

Counter module 84 includes a multi-bit register 86 configured so as to provide a shift and count function. The selection between the shift and count functions is provided via programmable input lines 88 and 90. The count function is provided when the control lines are at one logical state whereas the shift function is provided when the control lines are in their opposite states. Gates 92, 94 and inverter 96 cooperate to steer the data to the count input or shift input of the register 86. Data is applied in the shift mode over line 98 to the MSB input of register 86 whereas data is applied over line 100 to the LSB input in the count mode.

Provision is made for generating an output signal to bus line 24 to control the operation of memory module 34 as a function of the value of data in shift register 86. In the preferred embodiment, this output signal is generated when each bit position in register 86 is 0. To accomplish this function, zero detector circuitry including NOR gates 102 and 104 and zero detect enable control line ZDT 106 is provided. The output of gate 104 provides an input to NOR gate 108. The other inputs of gate 108 are from the Q1 SHIFT OUT output of register 86 and a programmable enable input line $\overline{0107}$ from control processor 14.

IV. General Example

When all of the bits in register 86 are 0, the zero detector function line 106 is enabled and the output line 107 is enabled, then, gate 108 will go high causing the output of inverter 110 to go low. The low output on inverter 110 pulls the bus line 24 to ground and prevents the transmission of any further clock pulses. It will be remembered that bus line 24 is connected to all of the other modules associated with the same elemental processor 26. Thus, it is possible to control the operation of a module on another functional plane depending upon the detection of a given value in another module. In the preferred embodiment, the given value is the value of 0 in counter module 84. When register 86 reaches 0, the logic function performed by the shifting of shift register 36 ceases. This is because the input to memory module gate 72 goes permanently low since it is connected to bus line 24 which has been pulled to ground by the circuitry in the counter module 84. As discussed above, a low input to gate 72 from bus line 24 will cause gate 80 to go low thereby preventing any further clock pulses from reaching the CK input of register 36.

Thus, it can be appreciated that the present invention provides detection means for detecting a preselected value (e.g., 0) in a given module (e.g., 84) associated with the particular elemental processor. Control means are also provided for controlling the operation of the logic means (e.g., register 36) in another module (e.g., module 34) as a function of the detection of that value. Those skilled in the art can appreciate that this provision enables the cellular array architecture to perform data dependent processing.

This particular need is especially pronounced in order to provide the capability of performing floating point arithmetic functions. For a given total number of bits (mantissa + exponent) dedicated to the data, the floating point arithmetic offers larger dynamic range but the accuracy is generally lower. Using this arithmetic there is a trade-off between the dynamic range and the accuracy. However, one can find a readily available trade off to satisfy both the accuracy and the dynamic range at the same time. The dynamic range increases with the number of bits dedicated to the exponent much "faster" than the accuracy decreases. Therefore, by dedicating a few of the data bits to the exponent, one gains a large increase in dynamic range but while suffering only a modest loss of accuracy.

The present invention will be described in connection with two additional examples in connection with doing floating point arithmetic: namely, addition/ subtraction and multiplication. However, it should be understood that these are not to be construed as limiting the scope of the invention.

V. Floating Point Addition/Subtraction

Figure 5:
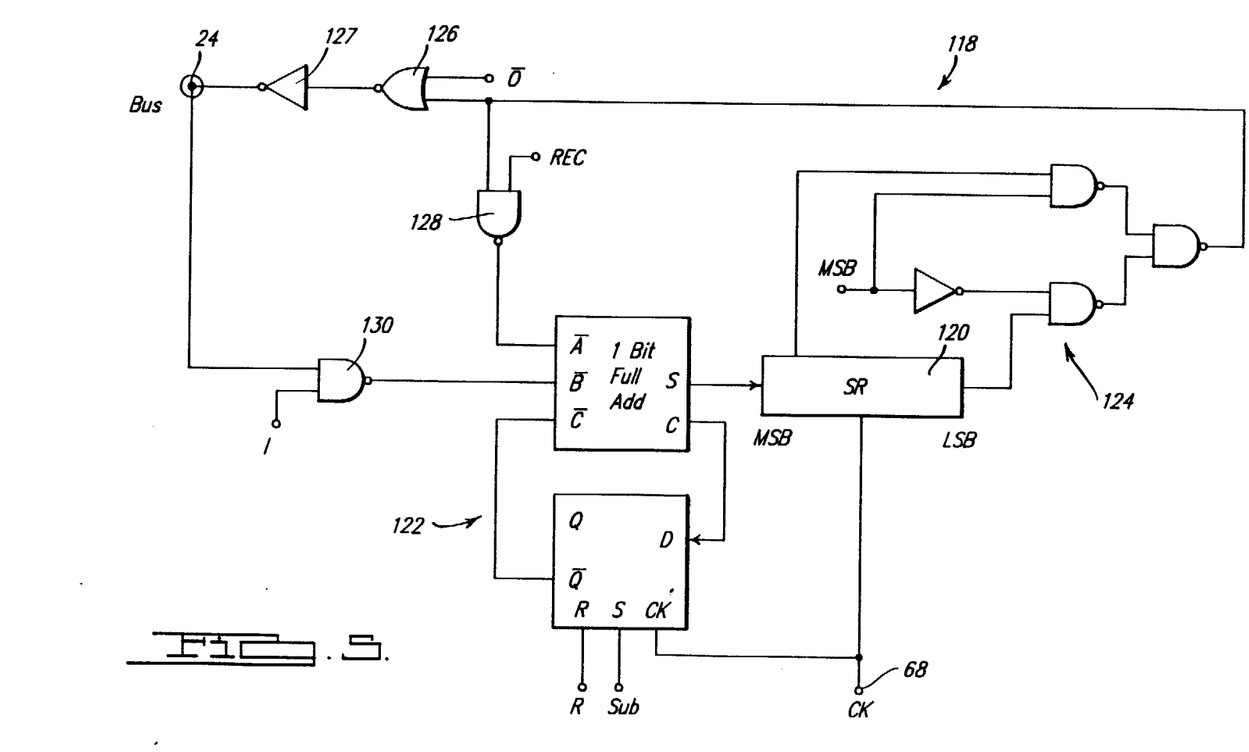
FIG. 5 is a schematic diagram of an accumulator functional module.

In the following example, reference is made to functional planes labeled as shown in FIG. 1. For example, six memory planes (M1–M6) containing memory modules 34 of FIG. 3 are used, two counter planes (C1–C2) having the construction of FIG. 4 are used, and three accumulator planes (A-1–A-3) of FIG. 5 are used. The accumulator construction of FIG. 5 corresponds to the accumulator design in the aforementioned incorporated-by-reference patent documents. Thus, they need not be described in detail herein. Briefly, accumulator module 118 is designed to serially sum two data words and store the result. It includes a multi-bit register 120 and a 1-Bit Full Adder with carry circuit 122. Upon application of clock pulses over line 68, data in register 120 is shifted to the right to be outputted on bus line 24 through selection circuitry 124 and enable gate 126. The data can also be recirculated via gate 128 and an appropriate REC enable signal. Data is input to circuit 122 and then to register 120 over bus line 24 via gate 130 appropriately enabled by control line (I).

Assume two floating point numbers are represented by (m1, E1) and (m2, E2). The "m's" represent mantissas and the "E's" represent exponents. E1 is stored in M1, E2 in M2, m1 in M4 and m1 in M5. (If single memory is used to store the mantissas and the exponents, we separate them to different memories and we proceed in the same way). Assume also that the numbers are normalized and represented in 2's complement form.

First we subtract the two exponents (E1-E2) and we use the sign bit of the difference to recognize which of the exponents is larger. The larger exponents from the memory plane M2 are transferred to the accumulator (FIG. 3) by using the sign bit as a mask. Now we shift the value m1 by (E2-E1) steps to the right (in the locations that E2-E1>0). This is accomplished by applying n clock pulses CK to the bus lines 68 (n=maximum bits of m). These pulses are directed to modules 34 in M4 and to the counter/shift register 84 in C1 and C2. In M4 the control line "Local Shift" is on, therefore these pulses shift the memory registers 36 (m1) to the right. By using the sign bit again the pulses are directed only to the memory locations on the plane M4 which correspond to E2-E1≧0.

The exact number of shifts is determined in the following way. The value E1-E2 is shifted also to the counter/shifter register. This value is the 2's complement of E2-E1. The counter/shift register 84 is set to count. Therefore, the same clock pulses that shift M4 also increase the value in the counter. When counter 86 reaches full scale and then "Zero", the corresponding bus line 24 is pulled down by the zero detector of the counter and any following clock pulses on this line are shorted. It is important to note that instead of counting down the value (E2-E1), we are counting up, starting from (E1-E2) and detecting "Zero". These two are equivalent but the second is simpler to implement. To accomplish proper shift to the right of a positive (negative) number we have to shift in zero's (one's) to the most left locations. This is accomplished by setting the MSB and the recycle control lines on the memory wafer to "on". This results in shifting-in the sign bit into the most left locations. In addition, we have to add one to LSB of the negative number (2's complement). This is accomplished by prestoring one LSB in the accumulator (see step 5 below).

This procedure is repeated for the case E1-E2≧0. As a result, the E1 of the appropriate location is stored in the same accumulator as E2 before and M5 is shifted in a similar way as M4 before. Now corresponding locations of M4 and M5 have the same exponent, therefore we simply add (subtract) these two planes and the result is stored in A3.

Following this addition (subtraction) cycle we check for an overflow. The n-bits result is stored in the memory register 120 of the A3 and any overflow bit is stored in the associated carry register of A3. We transfer the n-bits result from A3 to M6. Following this the overflow bit (if there is an overflow) is in the LSB location of A3. (This is actually the sign bit that has been shifted to the overflow position). Now we will correct for overflows. An overflow may occur on addition when both numbers have the same sign (either positive or negative), or on subtraction when the two numbers have opposite signs. These cases are treated in a similar way.

Table 1 gives the possible overflow bit as a function of the sign bits and the addition/subtraction operation. (In position "0" the overflow bit will be zero or none, in position "1" it will be one or none, in position "none" there will be no overflow). The overflow bit is actually the sign bit of the sum.

TABLE 1

| | The overflow bit | | | |
|---|---|---|---|---|
| Sign bits | 00 | 11 | 10 | 01 |
| Addition | 0 | 1 | none | none |
| Subtraction | none | none | 1 | 0 |

To detect the overflow condition in the case of an addition, we send to the counter (C1) the first sign bit (from M1) inverted and then the second (from M2) not inverted. A "1" in the LSB position of the counter will indicate the overflow condition. In the case of the subtraction we send the two sign bits not inverted to the counter and, as before, the "1" in the LSB position of the counter will again indicate the overflow condition. To correct the overflow condition in locations that the overflow bit =1, we simply use the overflow bit stored in the LSB location of A3 in three ways. It serves as a clock for M6 to shift M6 one step to the right; it is shifted to the MSB of the memory register of M6 and it increases the corresponding exponent value stored in A2 by one. At the same time this overflow bit is transferred to M3 to be used in the next step to correct the overflow bit =0 cases.

To accomplish this we transfer the bit stored in the LSB location in the counter (C1) to shift M6 and to increase the exponent value stored in A2 by one. During the transfer of this bit (from the counter) a mask is used which is created by the inverted polarity of the MSB of M3. This mask excludes all the locations that the overflow bit =1. Therefore, the usual "AND" operation of this inverted mask and the LSB of the counter (=all overflow locations) selects the locations that the overflow bit =0. In addition, during this transfer the input to M6 is off, therefore, the bit shifted to the MSB location of M6 (sign bit) is "0".

This completes the corrections of the overflow conditions.

Now we will correct the locations with the "underflow" condition. These are the mantissas smaller than full scale. We will normalize them. Assuming that m1 and m2 were normalized, the underflow condition will occur in all locations that an overflow did not occur (cases designated "none" in the Table), except the case that m1=0 or m2=0. Note that the "underflow" bits have the same value as the sign bit. For instance: $0.000101 = 0.101 \times 2^{-3}$ or $1.111010 = 1.010 \times 2^{-3}$. (The three zeroes (ones) after the point are the underflow bits.) We will normalize separately the positive and the negative numbers. We will copy the sign bit from M6 to M3 to help us with the separation. We copy the M6 content into C1 while using the inverted sign bit stored in M3 as a mask. This results in copying only positive numbers into C1. Next we shift the content of C1 while its zero detector control line is on. When all the significant bits are shifted out of Cl, the zero detector goes on and pulls the corresponding bus line 24 to zero. At the same time that Cl is shifted, n clock pulses are fed into the bus lines. These clock pulses recycle M6 and also are counted by C2. When the C1-zero detector goes on, the clock pulses stop. This results in recycling of M6 until the MSB of the mantissa is in the MSB position of the register (which is equivalent to the appropriate shift to the left of the content). The reader should also note that the content of C2 counter-$n_c$ is equal to the number of shifts of C1 to shift-out all the significant bits of m and it relates to the number of left shifts required to normalize the m in the following way:

$$n_1 = n - 1 - n_c$$

where $n_1$ is the desired number of left shifts to normalize m, (n−1) is the total number of bits minus the sign bit and $n_c$ is the number stored in C2. We will use this relationship when we correct the exponents for the shifts.

In a similar way we are shifting the negative numbers. To select them we use again the sign bit stored in M3, but this time we do not invert the sign bit, but we do invert the output from M6 to C1.

In the next step we shift-in the sign bit from M3 to M6. This accomplishes the normalization of the mantissas. Now we have to correct the exponent values for the shift. This will be done by using the content of C2 which is equal to the number of recycle steps required to bring the MSB of the mantissa to the MSB position in M6. The correct value of the exponent is $n_e - n_1$. $= n_e - (n - 1 n_c) = n_e + n_c - (n - 1)$ where $n_e$ is the exponent value to be corrected and which is stored in A2. Therefore, first we add the content of C2 to A2 and then subtract from A2 the constant (n−1) which is fed from the control unit through the replicator plane to A2. Next we transfer A2 to M3. Following this step the normalized mantissas are stored in M6 and the exponents in M3. The starting numbers (m1 E1) and m2 E2) in M1, M2, M4, M5. This accomplishes the floating point addition (subtraction).

A simplified code for the above described method is set forth below:

Note E1 in M1, E2 in M2, m1 in M4 and m2 in M5→denotes execution, —denotes setting of a control line (we will omit showing the obvious settings).

1. M1 and M2 - Rec (Recycle control line = 1)
   M1 - M2 → A1 (E1-E2 in A1)
2. A1 → M3 and C1 (E1-E2 in M3 and C1)
3. M3 - MSB (MSB control line = 1); A2 - Recycle
   M2 → A2 Larger exponent E2 in A2)
4. M3 - MSB; M3 - O (output control line=1); M4 - Loc. Sh. (Local shift control line=1); M4 - O = ∅
   M4 - MSB, M4 - Rec. (Will bring in 1's or ∅'s into most left location of the shifted numbers);
   C1 - I (Input control line = 1); C1 - O (output control line = 1); C1 - Zero Det. (Zero detector control line = 1); C1 - CNT (Count/shift control line = 1, means counter mode) → Feed n clocks to bus lines (n=maximum bits of m)
5. M3 - MSB, M4 - MSB (Mask to select the locations on M4 that E1-E2≦∅and m1≦∅); A3 - I, A3 - Rec.=∅, A3 - SUB=1 (presets the carry register).
   → Feed one clock pulse to the bus lines. (Stores 1 at the carry register in A3 of the selected locations to accomplish proper shift of negative numbers. In -continued other locations stores 1 in MSB of A3 which will be shifted out (lost) in the next step).

6. M4+A3 → A3.
7. A3 → M4.
   All M4 locations that E1-E2≦ ∅are properly shifted.
8-14. Repeat steps 1 through 7 but exchange M1 and M2; also M5 and M4 in the notation.
15. M4 ± M5 → A3
16. M3 → M6
    Now we will check and correct for an overflow. At the end of step 15 the overflow bit was stored in the carry register of A3. After step 16 it is in the LSB of A3.
17. C1 - CNT, M1 - MSB, M1 - INV (in case of addition) or NON INV (in case of subtraction).
    → one clock pulse to C1, no clock pulse to M1 (copies sign bit from M1 to C1)
18. C1 - CNT, M2 - MSB
    → one clock pulse to C1, no clock pulses to M2 (adds the sign bit from M2 to C1).
    Step 17 plus step 18 are equivalent to "Exclusive Or" operation and "1" in the LSB location in C1 indicates the overflow condition.
19. A3 - O; M6 - Loc. Sh.; M6 - I; A2 - I; A2 - Rec.; M3 - Rec.; M3 - MSB; M3 - I.
    → Shift A3 and A2 (Accomplishes one shift at the overflow locations in M6, puts the overflow bit to the MSB location in M6, increase the corresponding exponent by 1 in A2 and stores the overflow bit in MSB location of M3).
    Step 19 corrects for the overflow bit = 1 case. Now we will correct the case of overflow bit = •
20. M6 - Loc. Sh., M6 - I=∅ (the input to M6 is off which results in shifting-in zero)
    A2 - I, A2 - Rec, M3 - Inv, M3 - MSB, M3 - Rec
    C1 → A2 (clock pulses to A2 only)
    Now we will correct the underflow condition (we will normalize the mantissa to full scale)
    First the positive numbers:
21. M6 - MSB (no clock applied to M6; one clock to M3) M3 - I
    M6 → M3 (sign bit copied to M3)
22. M6 - Rec, M3 - MSB, M3 - Inv (positive numbers mask)
    M6 →C1
23. M6 - Rec, M6 - Loc. Sh., C1 - CNT=∅, C1 - zero det., C1 - O, C2 - CNT
    → feed n pulses to bus lines
    Now we will normalize the negative numbers.
24. M6 - Rec, M6 - Inv., M3 - MSB (negative numbers mask)
    M6 → C1
25. Same as step 23.
26. M3 - MSB (one pulse)
    M3 - M6 (adds the sign bit to the normalized mantissas)

Now we will correct the exponents for the shifts. We have to subtract from A2 the number of shifts to the left of the mantissas m. The number of the shifts to the left=total number of bits of m minus 1, minus number of recycle steps M6 (stored in C2, see 23 and 25). What we are actually doing is:

$$n_e - (n - 1 - n_c) = n_e + N_c - (n - 1)$$

where $n_e$ is the value of the exponent stored in A2, n is the number of bits of m (including the sign bit) and nc is the number of recycle steps of M6 stored in C2.

27. A2 - Rec.
    C2 → A2
28. Control unit - 2's complement of (n-1)

-continued

| | Control unit → replicator plane → A2 |
|---|---|
| 29. | A2 →M3. |
| | The normalized mantissas are in M6 and the exponents in M3. |

The normalized mantissas are in M6 and the exponents in M3.

VI. Floating Point Multiplication

Assume two floating point numbers are represented by (m1, E1) and (m2, E2). Assume m1 is stored in M1, m2 in M2, E1 in M3 and E2 in M4. Assume also that the two numbers are normalized and represented in 2's complement form.

A 2's complement number can be represented as a sum n+S, where n is a positive mantissa $(0.X_1...X_n)$ and S is the value of the sign bit (zero or −1.000...0). Therefore, a multiplication can be represented as (n1+S1)(n2+S2)=n1n2+n1S2+n2S1+S1S2. The term n1n2 is simple multiplication of positive numbers, n1S2 and n2S1 are either zero, if the corresponding sign bit is zero, or they are 2's complements of the positive mantissas if the corresponding sign bits are (−1), S1S2 is multiplication of the sign bits and its value is either zero or one.

Now we would like to bring a few numerical examples. These will be maximum mantissas value examples:

| | | | | |
|---|---|---|---|---|
| n1n2 | ⎧ 0.11<br>⎪ 0.11<br>⎨ 011<br>⎪ 011<br>⎩ 000 | 1.01<br>1.01<br>011<br>000<br>000 | 1.01<br>0.11<br>001<br>001<br>000 | 0.11<br>1.01<br>011<br>000<br>000 |
| n1S2 | 000 | 111 | 000 | 101 |
| n2S1 | 000 | 111 | 101 | 000 |
| S1S2 | 0 | 1 | 0 | 0 |
| | 0.1001 | 0.1001 | 1.0111 | 1.0111 |

It is important to note that even though the mantissas of the multiplicand and the multiplier are of maximum value, there is no overflow (except when both numbers are negative; but in this case the overflow bits are simply neglected). We did exclude here the negative number 1.0000...0, which is outside the full scale.

In the above examples the product is already normalized and there is no underflow to take care of. This is not the case when the input mantissas are less than of the maximum value. This is shown in the following examples

| | | | | |
|---|---|---|---|---|
| n1n2 | ⎧ 0.10<br>⎪ 0.10<br>⎨ 000<br>⎪ 010<br>⎩ 000 | 1.01<br>0.10<br>000<br>001<br>000 | 0.10<br>0.11<br>010<br>010<br>000 | |
| n1S2 | 000 | 000 | 000 | |
| n2S1 | 000 | 110 | 000 | |
| S1S2 | 0<br>0.0100 | 0<br>1.10010 | 0<br>0.0110 | |

It is enough that one of the mantissas is not at the maximum value for the underflow to occur. The underflow is manifested when the sign bit and the MSB have the same value, either zero or one. It is important to note also that in the case of multiplication, the maximum underflow that can occur is only one digit, and the simplest indication is that the S bit and MSB have the same value.

The execution is quite simple. First, we add the exponents. Then we separate the mantissas from the original sign and add a new sign which is zero. Now we simply multiply the mantissas using the algorithm of positive numbers multiplication. A numerical example of this multiplication is shown below:

| | | | | | | | | | |
|---|---|---|---|---|---|---|---|---|---|
| | | n | 1 | 1 | 1 | 1 | 1 | n | 1 |
| M1 | 011 | 011 | 011 | 101 | 110 | 011 | 011 | 011 | 011 |
| M2 | 011 | 011 | 101 | 101 | 101 | 101 | 110 | 110 | 011 |
| M3 | 000 | 000 | 100 | 100 | 100 | 100 | 010 | 010 | 010 |
| A1 | 000 | 011 | 001 | 000 | 000 | 100 | 010 | 010 | 010 |
| (CR) | 0 | 0 | 0 | 1 | 1 | 0 | 0 | 0 | 0 |

(# of cycles between the two states)

The multiplicand (n bits) and the multiplier (n bits) are stored in M1 and M2. The product (2 n bits) appears in A1 (the n more significant bits) and in M3 (the n less significant bits). The carry register (CR) is part of the accumulator A1, but for clarity it is shown separately. The top row indicates how many cycles it takes to go from one state to the next state shown. To accomplish the multiplication there is a need for $(n^2+n)$ cycles.

The LSB of M2 serves as a mask to add the M1 to A1. This takes n cycles. In the first phase (first n cycles) any previous data in A1 is shifted out (lost). M1 is in the recycle mode and also M2 can be (if one is interested in preserving the data in M2). In the next phase (one cycle) the LSB from A1 is shifted to M3 (it could be shifted into M2 if one is not interested in preserving the multiplier data, or it could be just shifted out from A1 and lost, if one is interested only in a single precision product). At the same time M2 is also shifted one step. Then again, using the new LSB of M2 as a mask, the content of M1 is added to A1 (n cycles). The whole process is repeated n times except in the last cycle only M2 is shifted (to obtain back the content of M2).

Following this multiplication we have to add the 2's complement of the positive mantissas of one plane if the corresponding sign bit on the other plane is "1". If it is zero, then we add zero (+n1S2+n2S1). This is accomplished in steps 7 through 10 (of the following simplified code) in two subphases. First we calculate the 2's complement of the whole mantissas n1 plane, then we add them to the partial product in A2 using the sign bit S2 as a mask. The last step of the multiplication process is to add the S1S2 to the sign bit of the partial product in A2 (steps 11 and 12).

The normalization process is accomplished in steps 13–16. As one recalls there is no overflow in multiplication and there can be a maximum of one bit underflow. The underflow occurs when the sign bit and the MSB of the product have the same value, either one or zero. It is easy to detect the locations without the underflow (full scale mantissas). There, one of the bits is zero and the other is one, and a serial "Exclusive OR" function will do the job. We already saw before that this function can be very nicely implemented by one bit counter. The counter will be in "1" state only if the two bits are 0,1 or 1,0. So first we transfer the product from A2 to M5, but only the last 2 bits go also to C1. Then we recycle the M5 with n−1 (15) cycles only (step 15). The last clock pulse comes from the bus line (local shift) and at the same time we use the C1 as a mask. It means that the last shift will occur only in the locations that there is no underflow. The underflow location will not be shifted. This is equivalent to shifting the underflow locations one step to the left, with the exception that the shifted-in LSB has always the same value as the sign bit. This actually has some advantage because it eliminates the mentioned before full scale negative numbers (1.00...0). Now we have to correct the exponent values of the product for the normalization of the product mantissas. We have to subtract "1" from the exponents corresponding to the locations that the mantissas were not shifted in step 16. Subtraction of "1" is equivalent to the addition of a string of ones. Therefore, we will add the string of ones using the inverted bit stored in C1 as a mask (as the reader recalls "1" in C1 indicated the shifted locations). This completes the floating point multiplication process.

The following is a simplified code for the aforementioned floating point multiplication method just described:

---

Assume m1 in M1, m2 in M2, E1 in M3 and E2 in M4.

1. M3+M4 → A1 (the exponents of the unnormalized product are stored in A1). Now we will separate the mantissas from the original sign bits. All the "new" sign bits enclosed with the mantissas will be zeroes.
2. M1 - Rec.
   M1 → M5 (n-1 clocks only)
3. M5 - I = ∅ (shifts zeroes to M5)
   → one clock pulse to M1 and M5 (m1 with $S_{new} = ∅$ in M5, original data in M1).
4 & 5. Repeat steps 2 & 3 but change M1 and M2 and M5 to M6.
   Positive mantissas are in planes M5 and M6. Now we can simply multiply them using positive numbers multiplication algorithm.
6. M5 × M6 → A2
   Now we will add the 2's complement of the positive mantissas of one plane if the corresponding sign bit on the other plane is "1".
7. A3 - SUB, M5 -INV
   M5 → A3 (2's complements of n1 in A3)
8. M2 - MSB (mask of S2 = 1)
   A3 + A2 → A2 (adds 2's complement of n1 if S2 = 1)
9 & 10. Repeat steps 7 & 8 but change M2 to M1 and M5 to M6
   Now we will add the product of the two sign bits with the bit at the sign location of A2
11. A2 - Rec.
    → 15 clocks to A2
12. M1 - MSB, M1 - O, M2 - MSB, M2 - O, A2 - I, A2 - Rec.
    → 1 clock to A2 (adds the product of the sign bits to A2)
    M1 × M2 in the form of 2's complement stored in A2. Now we will normalize it (we will correct for the possible one bit underflow).
13. A2 → M5 only n-2 clock cycles
14. C2 - I
    A2 → M5 2 clock cycles (unnormalized product mantissas stored in M5, LSB=∅ of C1 indicates underflow locations)

---

Assume m1 in M1, m2 in M2, E1 in M3 and E2 in M4.

15. M5 - Rec.
    → n-1 clock pulses to M5
16. M5 - Rec., M5 - Loc. Sh.
    C1 - O (mask for locations to be shifted one step
    = no underflow)
    → one pulse to bus lines
    Normalized product (mantissas with the sign bits) in M5. Now we have to correct the exponents. We have to subtract one from the exponent value in the locations that were not shifted in step 16.
17. C1 → M6 one clock pulse only
18. M6 - MSB, M6 - INV, M6 - O (mask for not shifted locations) A1 - I, A1 - Rec.
    → n clock pulses to the bus lines and A1, no pulses to M6. (subtraction of "1" LSB is equivalent to adding a string of ones)
19. A1 → M6
    The product is stored in M5 and M6 and the original data in M1, M2, M3, M4.

---

VII. Conclusion

It should be understood that while this invention has been described in connection with particular examples thereof, no limitation is intended thereby because other modifications shall become apparent to those skilled in the art after a study of the specification, drawings and following claims.

What is claimed is:

1. A method of operating a cellular array processor having a plurality of elemental processors defined by modules on different functional planes, said method comprising:
   detecting a given value of data stored in a given module and generating a signal in response to the detection of said given value, wherein said given module includes a memory having a shift register; and
   altering an operation in at least one other module in response to receipt of said signal, wherein said one other module is in a different functional plane than said given module, and
   wherein said method includes the step of:
   generating said signal when the data in said shift register is at a given value.

2. The method of claim 1 wherein said given value is zero.

3. The method of claim 2 wherein said one other module performs a shifting operation on data stored in a memory therein upon receipt of a clock pulse; and
   wherein said given signal prevents the clock pulses from being applied to said one module thereby ceasing the shifting operation.

4. The method of claim 3 wherein the cellular array processor performs floating point arithmetic functions.

5. The method of claim 4 wherein said floating point arithmetic functions include the step of:
   storing at least two floating point numbers each represented by a mantissa and an exponent into memory modules on different functional planes such that the mantissa of the first number is stored in one module, the mantissa of the second number is stored in another module, the exponent of the first number is stored in a third module, and the exponent of the second number is stored in a fourth module.

6. In an array processor for analyzing a two-dimensional array of spatially related data elements having different values, the processor including a matrix of elemental processors defined by a plurality of modules located on different functional planes, each plane including an array of said modules, each module containing logic means for performing at least one of a given number of logic functions on data stored therein, each module having a memory for storing at least one data element to be logically operated on by the logic means, with the array processor further including a data exchange subsystem for transferring data between the modules on different planes, wherein the improvement comprises:
  detection means for detecting a preselected value of data in a given module associated with a particular elemental processor, wherein said detection means generates a given output signal upon detection of said preselected value, said output signal being transmitted over the data exchange subsystem to all of the other modules associated with the same elemental processor whereby each elemental processor performs different data dependent operations on the data array, and
  control means for controlling the operation of the logic means in another module on a different plane of the same elemental processor as a function of the detection of said value.

7. The improvement of claim 6 wherein said given module includes a register for storing data therein, with said detection means comprising:
  means for detecting when the value of the data stored in the register is zero.

8. The improvement of claim 7 wherein said another module includes a shift register that operates to shift data therein upon receiving a clock pulse to a clock input thereof; and
  wherein said given output signal operates to prevent the clock pulses from being applied to the shift register input thereby ceasing further operations thereof.

9. Apparatus for performing floating point arithmetic functions, said apparatus comprising:
  an array processor for analyzing a two-dimensional array of spatially related numbers having different values, each number being represented by a mantissa and an exponent; the array processor including a matrix of elemental processors defined by a plurality of modules located on different functional planes, each plane including an array of said modules, a plurality of said planes including memory modules having a multi-bit shift register therein, the mantissa of a first number being stored in a first memory module of a given plane, the exponent of the first number being stored in a second memory module in a second functional plane, the mantissa of the second number being stored in a memory module of a third functional plane, and the exponent of the second number being stored in a memory module of a fourth functional plane; the array processor further including other functional planes including at least one counter module having a multi-bit register therein and an accumulator module; and the array processor also including a data bus line connecting said first, second, third and fourth memory modules together with said counter and accumulator modules to thereby define at least one elemental processor;
  a control processor connected to said array processor by a control bus including a clock line common to each of the modules;
  the counter module including detection means for detecting a preselected value of data stored in said multi-bit register and generating a given output signal over said data line; and
  at least one of said memory modules responding to the generation of said given signal by ceasing further shifting operations on the data stored therein.

* * * * *